(12) United States Patent
Khawand et al.

(10) Patent No.: US 8,391,501 B2
(45) Date of Patent: Mar. 5, 2013

(54) METHOD AND APPARATUS FOR MIXING PRIORITY AND NON-PRIORITY AUDIO SIGNALS

(75) Inventors: Charbel Khawand, Miami, FL (US); Mikhail U. Yagunov, Pompano Beach, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1268 days.

(21) Appl. No.: 11/610,155

(22) Filed: Dec. 13, 2006

(65) Prior Publication Data
US 2008/0144858 A1 Jun. 19, 2008

(51) Int. Cl.
H04R 29/00 (2006.01)
H04R 27/00 (2006.01)
H04R 3/00 (2006.01)
H04B 1/00 (2006.01)

(52) U.S. Cl. ............... 381/56; 381/82; 381/98; 381/119

(58) Field of Classification Search ............... 381/56, 381/119, 74, 73.1, 80–82, 98; 379/373.04
See application file for complete search history.

(56) References Cited

U.S. PATENT DOCUMENTS

| | | | |
|---|---|---|---|
| 5,652,800 A | 7/1997 | Roberts | |
| 6,011,851 A | 1/2000 | Connor et al. | |
| 6,230,131 B1 | 5/2001 | Kuhn et al. | |
| 6,662,022 B1 | 12/2003 | Kanamori et al. | |
| 7,272,232 B1* | 9/2007 | Donaldson et al. | 381/55 |
| 2004/0186734 A1 | 9/2004 | Heo et al. | |
| 2004/0193430 A1 | 9/2004 | Heo et al. | |
| 2006/0023900 A1* | 2/2006 | Erhart et al. | 381/119 |
| 2006/0094474 A1* | 5/2006 | Zatloukal et al. | 455/572 |
| 2007/0218878 A1 | 9/2007 | Khawand et al. | |

FOREIGN PATENT DOCUMENTS

| | | |
|---|---|---|
| EP | 0995191 B1 | 8/2005 |
| JP | 2005079922 A | 3/2005 |
| JP | 2006186651 A | 7/2006 |
| JP | 2006197625 A | 7/2006 |

OTHER PUBLICATIONS

Patent Cooperation Treaty, "Notification of Transmittal of the International Search Report and the Written Opinion of the International Searching Authority, or the Declaration" for PCT/US2007/085992, Jun. 4, 2008, pp. 1-12.
United States Patent and Trademark Office, "Non-Final Rejection" for U.S. Appl. No. 11/378,128, dated Apr. 4, 2011, 13 pages.
United States Patent and Trademark Office, "Final Rejection" for U.S. Appl. No. 11/378,128, Sep. 15, 2011, 17 pages.
United States Patent and Trademark Office, "Non-Final Rejection" for U.S. Appl. No. 11/378,128, Mar. 18, 2010, 19 pages.
United States Patent and Trademark Office, "Final Rejection" for U.S. Appl. No. 11/378,128, Sep. 30, 2010, 13 pages.

* cited by examiner

*Primary Examiner* — Xu Mei
*Assistant Examiner* — Douglas Suthers
(74) *Attorney, Agent, or Firm* — Scott M. Garrett; Sylvia Chen

(57) ABSTRACT

An audio processor (202) receives a non-priority audio signal (302) and a priority audio signal (304). The priority audio signal occupies a frequency band (408). The audio processor filters (320) the non-priority audio signal by suppressing frequency content in the same frequency region occupied by the priority signal, creating a filtered non-priority signal (412). The filtered non-priority signal and the priority signal are combined (328) and played over an audio transducer (110).

16 Claims, 4 Drawing Sheets

METHOD AND APPARATUS FOR MIXING PRIORITY AND NON-PRIORITY AUDIO SIGNALS

FIELD OF THE INVENTION

The invention relates generally to audio mixing, and more particularly to mixing multiple audio signals into one signal where one of audio signals is a priority signal that needs to be heard over other signals.

BACKGROUND OF THE INVENTION

Personal electronic devices are used for many different functions, and are very popular. Examples of such devices include personal digital assistants, palmtop computers, cellular telephones, digital medial players, and so on. The functions of these devices are often combined into single, multi-purpose devices. Thus, there is a convergence of function in the marketplace with respect to the design of personal electronics. As a result, these devices may often perform several tasks at a time.

One task for which such devices are increasingly used is audio playback and video with audio playback. That is, audio and video files may be stored on the device, and played back for the user to watch, hear or both. The audio processing involved has become sophisticated to the point that pre-processing of audio signals regularly includes audio shaping and other audio effects and enhancements. Pre-processing may emphasize certain frequency content of a signal to achieve a desired effect. Furthermore, while the device is engaged in audio playback, another function for which the device is designed may be triggered, and which may also generate an audio signal. For example, while listening to an music file, the device may receive a wireless telephone call. To alert the user to the call, the device will cut off the music and play an audio alert, or try and play the audio alert over the music. However, if the music is playing and has been enhanced in a frequency band used by the alert, the user may not perceive the alert. There is, therefore a problem with playing priority audio signals when non-priority audio signals are also being played, especially when pre-processing is used to enhance certain frequency content of the non-priority signals.

SUMMARY OF THE INVENTION

The present invention discloses in one embodiment a method of mixing audio signals at an audio processor. The method commences by receiving, at the audio processor, a priority audio signal and at least one non-priority audio signal. The priority audio signal occupies at least one frequency band of the audio spectrum. The audio processor commences filtering the non-priority audio signals to suppress frequency content of the non-priority audio signals in the frequency band occupied by the priority audio signal. The priority audio signal and the filtered non-priority signal is then combined, producing an output signal that is to be played over an audio transducer. The method may further include determining the location of the frequency band upon receiving the priority audio signal, or alternatively the frequency band parameters may be provided to the audio processor. In one embodiment the priority audio signal may be an alert tone for alerting a user of the mobile communication device. The non-priority audio signal may be an audio playback signal which may be derived from an audio file. The method may further include pre-processing the non-priority audio signal to enhance the audio content of the non-priority audio signal.

In another embodiment of the invention, there is provided a mobile communication device which includes an audio processor having a plurality of audio input channels. The device further includes at least one non-priority audio signal source operatively coupled to the audio processor which provides at least one non-priority audio signal. The device further includes a priority audio signal source operatively coupled to the audio processor for providing a priority audio signal. The priority audio signal occupies at least one frequency band. The audio processor filters the at least one non-priority signal by suppressing frequency content of the at least one non-priority audio signal in the at least one frequency band to provide at least one filtered non-priority audio signal. The audio processor further combines the at least one filtered non-priority audio signal and the priority audio signal to provide an output signal. The priority audio signal source may be an alert signal source. The at least one non-priority signal source may be at least one audio playback signal source. The at least one audio playback signal source may be an audio file stored on the mobile communication device. The audio processor may determine the at least one frequency band of the priority audio signal when it is received at the audio processor. Alternatively, the at least one frequency band may be characterized prior to receiving the priority audio signal at the audio processor.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
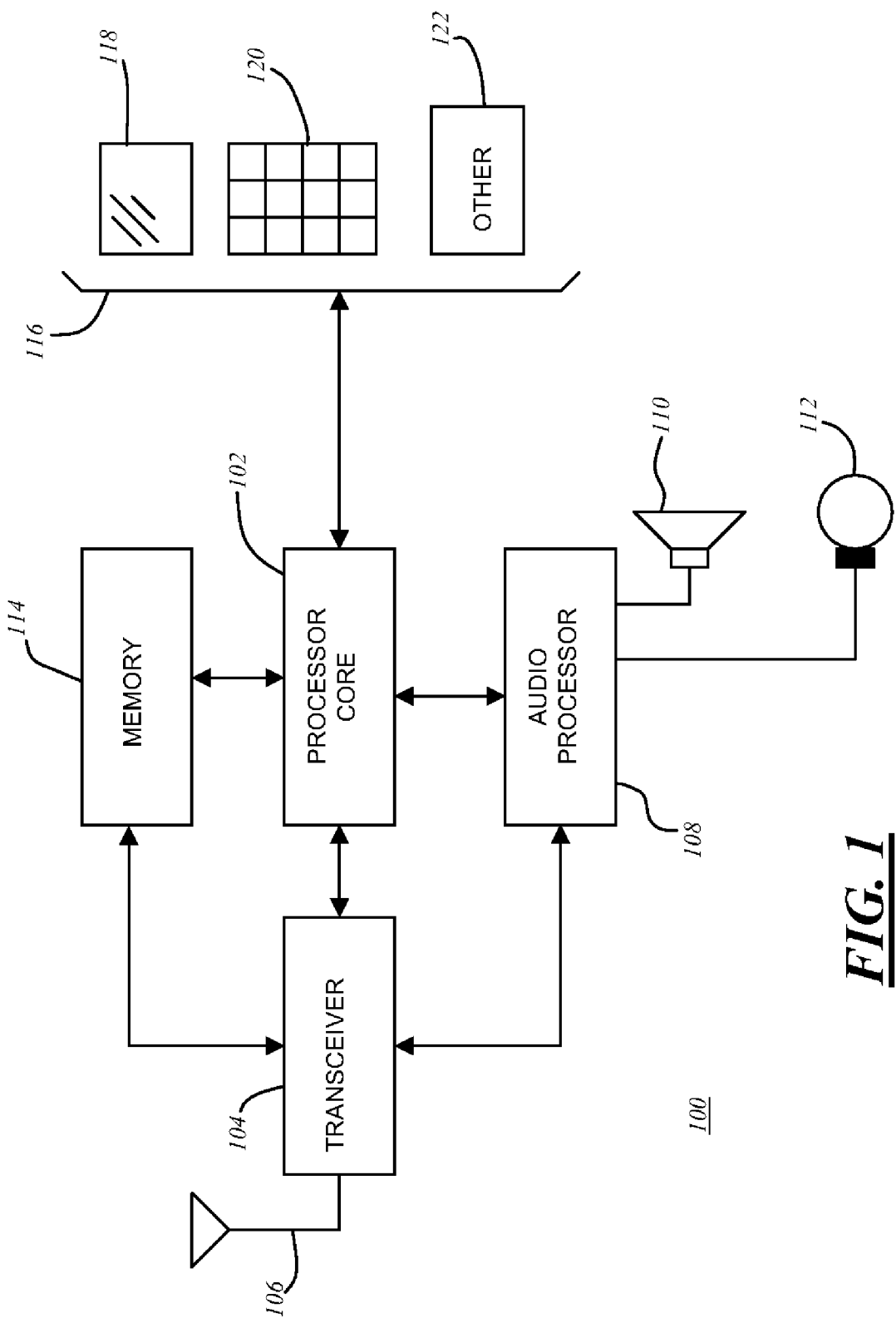
FIG. 1 shows a block schematic diagram of an electronic device exemplifying a communication device, in accordance with an embodiment of the invention.

Referring now to FIG. 1, there is shown a block schematic diagram of an electronic device 100 exemplifying a communication device, in accordance with an embodiment of the invention. The device includes a processor core 102 which includes one or more processors for performing various tasks and function according to instruction code executed by the processor core. The relevant functions will be explained herein. Operatively coupled to the processor core is a transceiver 104. The transceiver processes signals to be transmitted and received by an antenna 106 by a radio frequency carrier. Thus, the transceiver includes components such as oscillators, mixers, filters, modulators, demodulators, and so on, as is known. The transceiver may also include a digital signal processor for performing digital filtering, voice coding and decoding, error correction, and other well known transceiver functions. The transceiver and processor core are operatively coupled to an audio processor 108. The audio processor receives digital audio signals and converts them to analog signals to be played over a speaker or headphone transducer 110. Likewise, the audio processor receives analog signals from a microphone 112, and converts them to digital signals and routes the digitals signals to either the transceiver for transmission or to the processor core, or both. The audio processor may also perform audio pre-processing and mixing, and include digital signal processing elements in both hardware and software. The pre-processing may include, for example, audio shaping, sample rate conversion, gain change, filtering, and so on. It is contemplated that there may be several signal sources fed to the audio processor for playing over the speaker. Each of these signal sources is provided a channel, which is pre-processed and mixed with the other channels, if any, for playing.

The processor core and transceiver may further be coupled to a memory 114. The memory may include a variety of digital memory elements including read-only memory, reprogrammable memory, storage memory data memory, execution memory, volatile and non-volatile memory. Generally, the memory is used for storing instruction code to be executed by the processor core and other elements of the device, as well as data, and further provides executable memory for instantiating instruction code to establish a software operating environment, applications, and other software elements. In particular, according to one embodiment of the invention, the memory contains instruction code for controlling the mixing of audio signals in accordance with the invention. Furthermore, the memory may be used to store audio signal sources such as audio files or other audio playback sources for generating alert tones and ring tones.

The software elements stored in the memory facilitate the operation of a user interface 116 by the processor core 102. The user interface combines software elements with hardware elements for presenting information to a user and receiving information from the user. Information may be presented to the user via a graphical display 118 and associated driver circuitry. In some designs, such as communication devices that fold, there may be two displays: a main display on an inside region of the device and a smaller display on the outside that can be used to present limited information such as, for example, caller identification information upon receiving a call. The user interface may also include a keypad 120 and other buttons for entering information and commands into the device. Other interface elements 122 may include a vibratory motor for providing tactile responses for "silent" alerts, and may further include audio elements for presenting information in an audibly perceptible manner.

According to the invention, the audio processor, as may be facilitated by other elements of the device, mixes audio signals from various sources within the device. For example, the device may be receiving a voice signal over the transceiver, as when engaged in a call. The device may have audio files stored in the memory for playback, such as audio files in the well known MP3 format, commonly used for compressing music. In addition, while other audio signals are being played over the speaker, the device may need to alert the user audibly, such as to alert the user of an incoming call, or a second incoming call while engaged in a first call. These audio alerts are example of priority audio signals, while the other audio signals are non-priority audio signals. The audio processor filters the non-priority audio signals to suppress audio content in the frequency band corresponding to the priority audio signal's frequency content.

Figure 2:
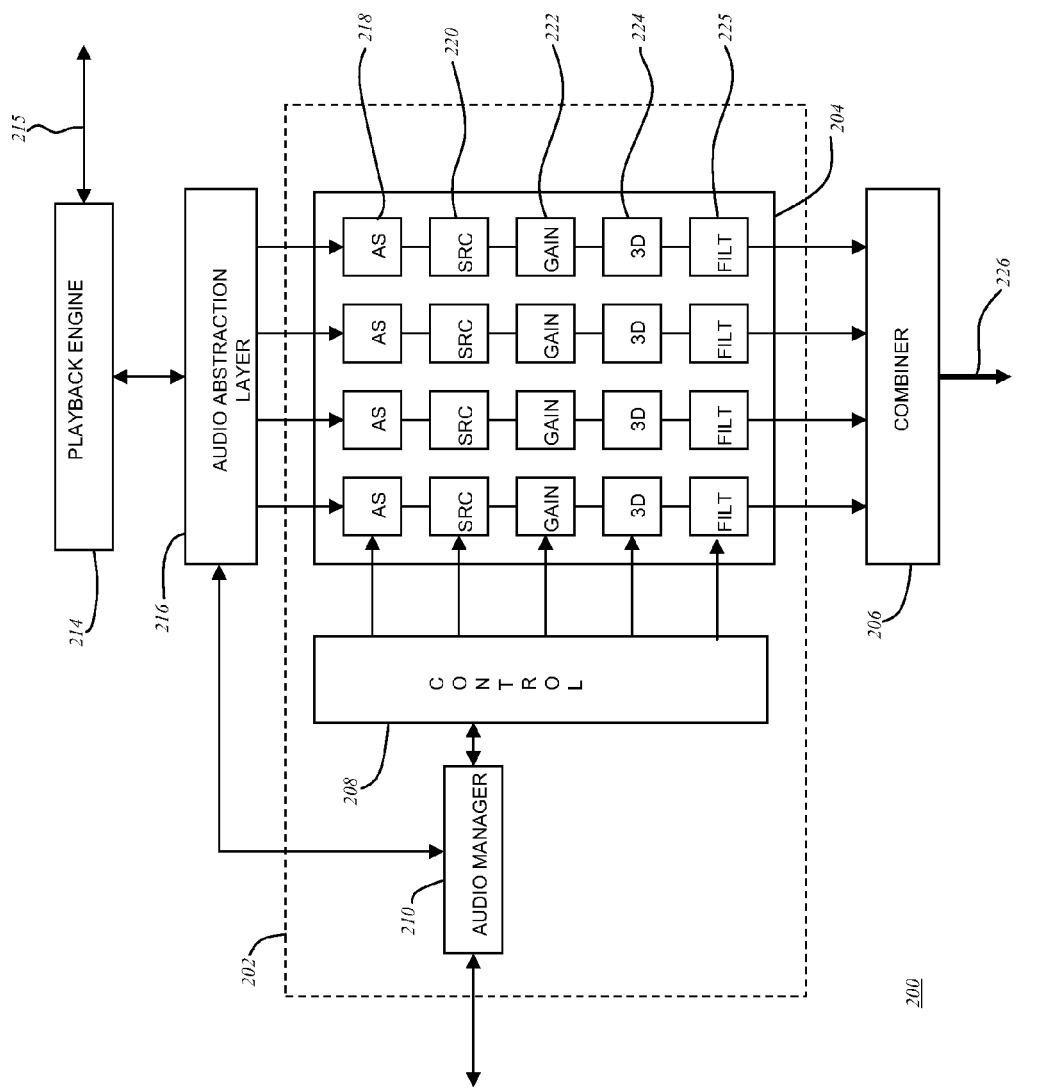
FIG. 2 shows a block schematic diagram of an audio processor and associated functions for use in an electronic device, in accordance with an embodiment of the invention.

Referring now to FIG. 2, there is shown a block schematic diagram 200 of an audio processor 202 and associated functions for use in an electronic device, in accordance with an embodiment of the invention. The audio processor includes an audio pre-processor 204 and a combiner 206. The audio processor has a plurality of input channels for receiving audio signals from an audio abstraction layer 216. The audio abstraction layer represent sources of audio signals within the device that are to be played by the audio processor over an audio transducer. Audio signal sources may include audio playback signals received from a playback engine 214, which generates the audio playback signal from an audio file or audio parameters stored in memory as indicated by arrow 215.

In the present example, the audio processor has four input audio channels. These channels feed into the pre-processor 204. The signals fed into each channel may be operated on by various processes. For example, there may be an audio shaping (AS) process 218, and sampling rate conversion (SRC) process 220, a gain adjustment process 222, and a three dimensional (3D) audio process 224. Such processes, and others, are known, and may be applied to either analog or digital audio signals. Each of these processes are controlled by a control process 208 which sets the parameters and dimensions for each process, as directed by an audio manager function 210. The audio manager function 210 receives information from the audio abstraction layer 216 and from other sources in the device regarding each of the audio signals being processed so that the audio manager can appropriately control the pre-processing of each audio signal.

The audio signals may further be filtered by a filter process 225. Specifically, non-priority audio signals may be selectively filtered to suppress frequency content in bands occupied by the frequency content of priority audio signals on other channels. When an audio signal is presented to the audio processor, the audio manager may be informed that the signal on a particular channel is a priority signal. In accordance with the invention, the audio manager will cause other channels to be filtered accordingly, suppressing frequency content in spectral regions used by the priority signals. Subsequent to the preprocessing, the audio signals are combined in a combiner or mixer 206, resulting in an output signal 226. The output signal may itself have multiple channels, such as in the case of stereo output.

Figure 3:
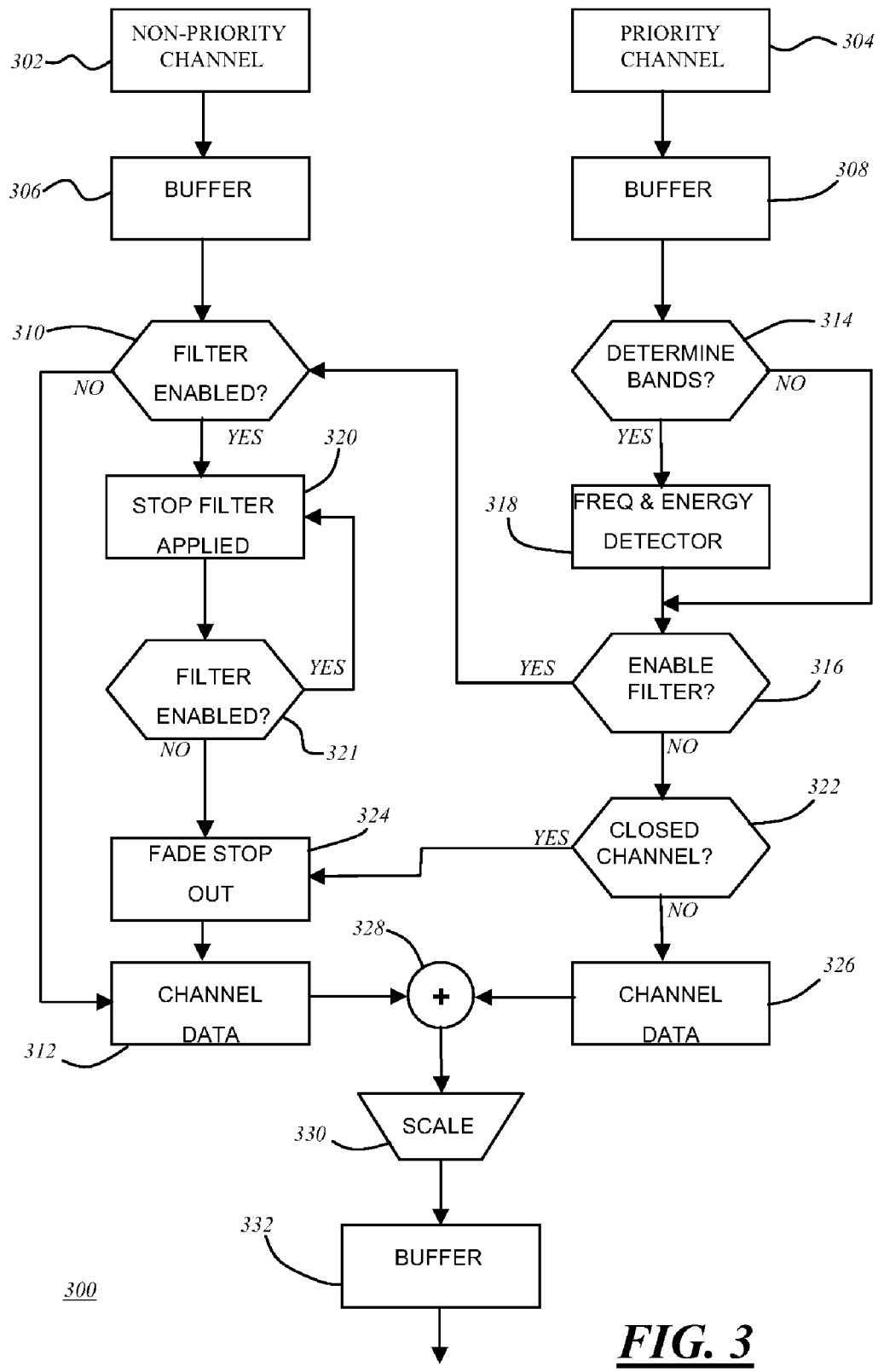
FIG. 3 shows a flow chart diagram of a method of mixing audio signals, in accordance with an embodiment of the invention.

Referring now to FIG. 3, there is shown a a flow chart diagram 300 of a method of mixing audio signals, in accordance with an embodiment of the invention. The diagram shows two audio signal paths or channels involved in the invention, a non-priority channel 302 and a priority channel 304. Additional priority channels and non-priority channels may be provided, but for the sake of clarity, only one of each is presented here. The non-priority channel is an audio channel in which a non-priority audio signal is received and processed. The priority channel is an audio channel in which a priority audio signal is received and processed. A priority audio signal is any signal which is meant to be heard over other, non-priority audio signals presently being played for the user of the device to hear. For example, the user may be listening to music produced by playback of an audio file when the device receives an incoming call page from a communication network. To alert the user to the incoming call, the device will combine an alert tone with the music signal, giving the alert tone a priority status and the music a non-priority status to ensure the user hears the alert tone, and that it isn't perceptively lost in the music. At the same time, however, the invention doesn't simply stop the music to play the alert tone, but rather processes the signals in a way that allows the user to hear both.

Upon receiving both the priority and non-priority audio signals, the signals are typically buffered 306, 308 at the audio processor. Upon processing the non-priority audio signal, the audio processor determines if a priority filter is to be applied to the non-priority audio signal 310. That is, if a priority audio signal is present, the priority filter will be applied. The filter will preferably be in the form of one or more stop-band filters that correspond to frequency band occupied by the priority signal. If the filter is not enabled, the channel data or signal is produced 312 without the priority filter.

When the priority audio signal is present, the audio processor must determine the frequency band or bands occupied by the priority signal 314. More than one frequency band may be occupied if, for example, the priority signal is a dual tone multi-frequency (DTMF) signal. The frequency band or bands occupied by the priority signal may be determined by the equivalent of a Fourier transform performed on the signal while it is provided to the audio processor, as indicated in block 318, or alternatively the function providing the priority signal may simply inform the audio manager of the frequency parameters. Upon receiving the priority signal, the device implements the priority filter in the non-priority signals, as indicated by box 316. When the filter is to be enable, a stop-band filter is applied to the non-priority signal, as indicated by box 320. The stop-band of the filter corresponds to the band or bands occupied by the priority signal. The filter continues to be applied as long as the priority signal is present, as indicated by decision box 321. Once the priority signal ceases, the priority channel closes, as determined at box 322. Accordingly, the stop-band filter is faded out of the non-priority signal, as indicated at box 324. While the priority signal is present, the channel data or signal is produced by the pre-processor, as indicated at box 326. The non-priority and priority signals may be combined or summed 328, and then the resulting summed signal may be scaled 330 and buffered 332 for output to a digital to analog converter, in the case of digital signals. It should be noted that the process shown here for the non-priority signal does not include any additional processing such as audio shaping or other audio effects that may occur in the channel.

Figure 4:
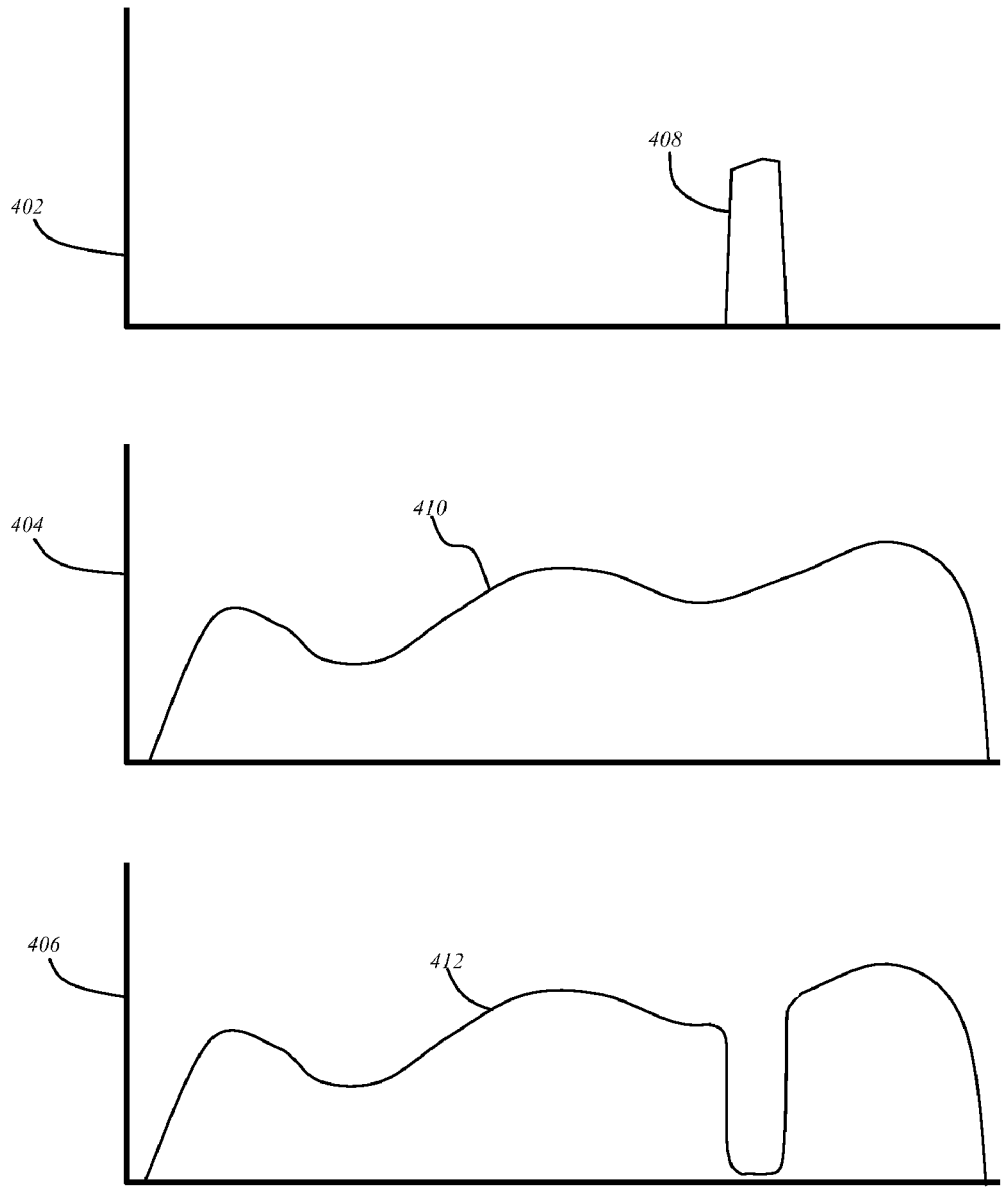
FIG. 4 shows a frequency chart diagram of a priority audio signal, and unfiltered non-priority audio signal, and a filtered non-priority audio signal, in accordance with the invention.

Referring now to FIG. 4, there is shown a frequency chart diagram 400 of a priority audio signal frequency graph 402, and unfiltered non-priority audio signal frequency graph 404, and a filtered non-priority audio signal frequency graph 406, in accordance with the invention. The charts indicate the frequency spectral content of the signals at a given point in time. Thus, it can be seen that the priority signal 402 occupies a frequency band 408. As noted herein, however, the priority signal may have more than one frequency band, or it may alternate frequency bands. The unfiltered non-priority signal frequency graph show the frequency spectrum 410 occupied by the non-priority audio signal. The example shown is only representative, and not intended to show any specific signal. In that regard the curve shown characterizes an envelope of the signal more than the precise frequency content, magnitude of harmonics, and so on. It is expected that the non-priority signal occupies a much wider region of the frequency spectrum. The audio processor, upon determining the frequency band or bands occupied by the priority signal, generates a stop band filter to apply to the non-priority signal or signals. The stop-band filter will suppress frequency content in the non-priority signal in the spectral region corresponding the band or bands occupied by the priority signal. The stop-band filter is preferably faded in over a brief period of time to avoid transients. The result of applying the stop-band filter to the non-priority signal is illustrated in chart 406. The filtered non-priority signal 412 has a notch in the region corresponding the band occupied by the priority signal. According to the invention, the priority signal of 402 is then combined with the filtered non-priority signal of 406 to produce the desired output signal where the priority signal can be heard without audible interference from the non-priority signal. It is contemplated that more than one priority signal may be present at a given time. Priority audio signals are not filtered or suppressed, even when they overlap in frequency. Only non-priority audio signals are filtered.

This invention can be embodied in other forms without departing from the spirit or essential attributes thereof. Accordingly, reference should be made to the following claims, rather than to the foregoing specification, as indicating the scope of the invention.

What is claimed is:

1. A method of mixing audio signals at an audio processor, comprising:
   receiving at the audio processor a priority audio signal occupying at least one frequency band;
   receiving at the audio processor at least one non-priority audio signal having a bandwidth greater than the at least one frequency band;
   stop-band filtering the at least one non-priority audio signal to provide at least one filtered non-priority audio signal, wherein the at least one frequency band is suppressed in the non-priority audio signal by the stop-band filtering and frequencies outside the at least one frequency band are not suppressed by the stop-band filtering; and
   combining the priority audio signal and the at least one filtered non-priority audio signal to provide an output signal.

2. A method of mixing audio signals as defined in claim 1, further comprising:
   determining the at least one frequency band from the priority audio signal upon receiving the priority audio signal.

3. A method of mixing audio signals as defined in claim 1, wherein the at least one frequency band of the priority audio signal is known at the audio processor prior to receiving the priority audio signal at the audio processor.

4. A method of mixing audio signals as defined in claim 1, further comprising:
   providing the output signal to an audio transducer.

5. A method of mixing audio signals as defined in claim 1, wherein the audio processor is disposed in a mobile communication device, and receiving at the audio processor the priority audio signal comprises:
   receiving an alert tone for alerting a user of the mobile communication device.

6. A method of mixing audio signals as defined in claim 1, wherein receiving at the audio processor at least one non-priority audio signal comprises:
   receiving at least one audio playback signal.

7. A method of mixing audio signals as defined in claim 6, wherein the at least one audio playback signal is derived from an audio file.

8. A method of mixing audio signals as defined in claim 1, further comprising:
   pre-processing at least one of the non-priority audio signals to enhance the audio content of the at least one non-priority audio signal.

9. A method of mixing audio signals as defined in claim 1, wherein the priority audio signal is a first priority audio signal, the method further comprising:
   receiving at the audio processor a second priority audio signal concurrently with receiving the first priority audio signal, the second priority audio signal occupying at least one frequency band; and
   filtering the at least one non-priority audio signal to suppress frequency content of the at least one non-priority audio signal in the at least one frequency band of the second priority audio signal to provide at least one filtered non-priority audio signal.

10. A mobile communication device, comprising:
    an audio processor having a plurality of audio input channels;
    a speaker coupled to the audio processor;
    at least one non-priority audio signal source operatively coupled to the audio processor for providing at least one non-priority audio signal; and
    a priority audio signal source operatively coupled to the audio processor for providing a priority audio signal, the priority audio signal occupying at least one frequency band that is less than a bandwidth of the at least one non-priority audio signal;
    wherein the audio processor stop-band filters the at least one non-priority audio signal to provide at least one filtered non-priority audio signal, wherein the at least one frequency band is suppressed in the non-priority audio signal by the stop-band filtering and frequencies outside the at least one frequency band are not suppressed by the stop-band filtering; and
    wherein the audio processor combines the at least one filtered non-priority audio signal and the priority audio signal to provide an output signal to the speaker.

11. A mobile communication device as defined in claim 10, wherein the priority audio signal source is an alert signal source.

12. A mobile communication device as defined in claim 10, wherein the at least one non-priority audio signal source is at least one audio playback signal source.

13. A mobile communication device as defined in claim 12, wherein the at least one audio playback signal source is an audio file stored on the mobile communication device.

14. A mobile communication device as defined in claim 10, wherein the audio processor determines the at least one frequency band of the priority audio signal from the priority audio signal when it is received at the audio processor.

15. A mobile communication device as defined in claim 10, wherein the at least one frequency band is characterized prior to receiving the priority audio signal at the audio processor.

16. A mobile communication device as defined in claim 10 wherein the priority audio signal source is a first priority audio signal source, the mobile communication device further comprises:
    a second priority audio signal source operatively coupled to the audio processor for providing a second priority audio signal, the priority audio signal occupying at least one frequency band;
    wherein the audio processor filters the at least one non-priority audio signal by suppressing frequency content of the at least one non-priority audio signal in the at least one frequency band of the second priority audio signal to provide at least one filtered non-priority audio signal.

* * * * *